US012292026B2

(12) United States Patent
Dreiss et al.

(10) Patent No.: US 12,292,026 B2
(45) Date of Patent: May 6, 2025

(54) VARIABLE SPEED RECONFIGURABLE PUMP/TURBINE CLUSTERS

(71) Applicant: Flowserve Pte. Ltd., Singapore (SG)

(72) Inventors: Andreas Dreiss, Geestland (DE); Mark O'Sullivan, Phillipsburg, NJ (US); Scott C. Judge, Bethlehem, PA (US); Gregory Morrison, Nazareth, PA (US)

(73) Assignee: Flowserve Pte. Ltd., Singapore (SG)

( * ) Notice: Subject to any disclaimer, the term of this patent is extended or adjusted under 35 U.S.C. 154(b) by 0 days.

(21) Appl. No.: 17/863,591

(22) Filed: Jul. 13, 2022

(65) Prior Publication Data

US 2024/0018934 A1 Jan. 18, 2024

(51) Int. Cl.
*F03B 15/18* (2006.01)
*F03B 15/08* (2006.01)

(52) U.S. Cl.
CPC .............. *F03B 15/18* (2013.01); *F03B 15/08* (2013.01); *F05B 2260/422* (2020.08);
(Continued)

(58) Field of Classification Search
CPC .......... F03B 15/18; F03B 15/08; F03B 15/00; F03B 13/06; F05B 2260/422; F05B 2260/80; F05B 2270/101; F05B 2270/404; F05B 2270/506; F05B 2270/20; F05B 2270/327; F05B 2220/20; F05B 2240/40;
(Continued)

(56) References Cited

U.S. PATENT DOCUMENTS 2,973,894 A 3/1961 Kimball
3,006,288 A 10/1961 Brown
(Continued)

FOREIGN PATENT DOCUMENTS

CA 2780451 A1 * 12/2012 ............ F01D 15/10
CH 625854 A5 * 10/1981
(Continued)

OTHER PUBLICATIONS

Merenda CH625854 English Machine Translation, translated by espacenet (Year: 1981).*
(Continued)

*Primary Examiner* — David E Sosnowski
*Assistant Examiner* — Ayne A Lambert
(74) *Attorney, Agent, or Firm* — Maine Cernota & Curran

(57) ABSTRACT

A "hydraulic rotating machinery" ("HRM") system provides optimal energy efficiency over a very wide conditions of service ("COS") range by configuring a plurality of variable speed HRMs in a "cluster." The HRMs are interconnected by one or more valves that can be actuated by a controller to configure and vary a flow path through which a process fluid flows from an inlet to an outlet. By actively selecting which of the HRMs are included in the flow path, the interconnections therebetween, and the operating speeds thereof, the controller ensures that the HRM cluster continues to operate at optimal efficiency as the COS fluctuates over a very wide range. The HRMs can be identical to each other, or can vary in design. The HRM system can be implemented for storage and retrieval of green energy. The controller can also monitor the health of the cluster and/or of the associated process.

12 Claims, 11 Drawing Sheets

(52) U.S. Cl.
CPC ..... *F05B 2260/80* (2013.01); *F05B 2270/101* (2013.01); *F05B 2270/404* (2013.01); *F05B 2270/506* (2013.01)

(58) Field of Classification Search
CPC ...... F04D 27/001; F04D 27/004; F04D 25/16; G05D 13/22; F16H 41/22; F16H 41/24; F16H 61/50
See application file for complete search history.

(56) References Cited

U.S. PATENT DOCUMENTS

| | | | | | |
|---|---|---|---|---|---|
| 3,447,550 | A * | 6/1969 | Victor | F03B 15/08 415/21 |
| 3,922,110 | A | 11/1975 | Huse | |
| 4,225,288 | A | 9/1980 | Mugele | |
| 4,505,647 | A | 3/1985 | Alloca | |
| 4,699,570 | A | 10/1987 | Bohn | |
| 4,850,809 | A | 7/1989 | Smith | |
| 5,595,477 | A | 1/1997 | Amlinger | |
| 5,944,049 | A | 8/1999 | Beyer | |
| 6,004,109 | A | 12/1999 | Gebele | |
| 6,042,331 | A * | 3/2000 | Kuwabara | F03B 13/06 415/36 |
| 6,589,023 | B2 | 7/2003 | Royce | |
| 6,602,044 | B1 * | 8/2003 | Kuwabara | F03B 3/10 415/36 |
| 7,021,888 | B2 | 4/2006 | Jostlein | |
| 7,814,922 | B2 | 10/2010 | Tollner | |
| 8,016,548 | B2 * | 9/2011 | Ziegenfuss | F03B 13/10 415/149.1 |
| 10,094,381 | B2 | 10/2018 | Calhoun | |
| 10,865,762 | B1 | 12/2020 | Vojnovic | |
| 2002/0138230 | A1 * | 9/2002 | Faymon | G05B 9/02 702/145 |
| 2007/0295209 | A1 | 12/2007 | Strauser | |
| 2010/0270801 | A1 * | 10/2010 | Liu | F15B 1/02 290/52 |
| 2015/0260151 | A1 | 9/2015 | Kang | |
| 2016/0229297 | A1 | 8/2016 | Finodeyev | |
| 2016/0230899 | A1 | 8/2016 | Cothem | |
| 2017/0114768 | A1 * | 4/2017 | Panchal | F03B 15/00 |
| 2017/0138213 | A1 * | 5/2017 | Olatunde | F03B 13/00 |
| 2017/0350632 | A1 | 12/2017 | Hirao | |
| 2018/0180019 | A1 * | 6/2018 | Jiang | H02J 15/006 |
| 2018/0313324 | A1 * | 11/2018 | Yeo | F03B 15/18 |
| 2019/0211661 | A1 | 7/2019 | Reckels | |
| 2020/0083676 | A1 | 3/2020 | Rochin Machado | |
| 2020/0109705 | A1 | 4/2020 | Suzuki | |
| 2020/0191109 | A1 * | 6/2020 | Hector, Jr. | H02K 7/1823 |
| 2021/0388809 | A1 * | 12/2021 | Young | F28D 20/00 |
| 2022/0195975 | A1 * | 6/2022 | Van Poecke | F03B 13/06 |

FOREIGN PATENT DOCUMENTS

| | | | | | |
|---|---|---|---|---|---|
| CN | 109356647 | A | 2/2019 | |
| CN | 111720253 | A | 9/2020 | |
| CN | 108035838 | B * | 11/2020 | |
| EP | 1544473 | A2 | 6/2005 | |
| EP | 2343436 | A2 * | 7/2011 | F03B 15/16 |
| JP | 48419 | B | 5/1970 | |
| JP | 2004263681 | A | 9/2004 | |
| JP | 2009011182 | A | 1/2009 | |
| JP | 2009539028 | A * | 11/2009 | |
| JP | 2010229962 | A * | 10/2010 | |
| JP | 2012180032 | A | 9/2012 | |
| JP | 5884934 | B1 * | 3/2016 | F03B 13/08 |
| JP | 6849034 | B1 * | 3/2021 | F03B 15/08 |
| KR | 101920414 | B1 | 11/2018 | |
| WO | 2009061443 | A1 | 5/2009 | |
| WO | 2017097378 | A1 | 6/2017 | |
| WO | WO-2019058764 | A1 * | 3/2019 | F03B 11/004 |

OTHER PUBLICATIONS

Uchida et al. JP 2004-263681 _ ProQuestDocuments-Oct. 10, 2024—English Machine Translation (Year: 2004).*
International Preliminary Report on Patentability for PCT Appl. No. PCT/US2021/015071 mail date Aug. 25, 2022, 7 pages.
International Search Report and Written Opinion for PCT Appl. No. PCT/US2019/060049 mail date Apr. 9, 2020, 14 pages.
International Preliminary Report on Patentability for PCT Appl. No. PCT/US2019/060049, mail date May 27, 2021, 10 pages.
Extended European Search Report for Patent Appl. No. EP19885343.4 mail date Dec. 14, 2021, 7 pages.
Office Action Restriction for U.S. Appl. No. 16/675,854 mail date Feb. 22, 2022, 7 pages.
Office Action for U.S. Appl. No. 16/675,854 mail date May 24, 2022, 44 pages.
Hartranft, John; 1991; "GE LM2500 Marine Gas Turbine Experience"; The American Society of Mechanical Engineers, pp. 1-6 (Year: 1991).
Notice of Allowance for U.S. Appl. No. 16/675,854 mail date Aug. 15, 2022, 16 pages.
Corrected Notice of Allowance for U.S. Appl. No. 16/675,854 mail date Aug. 17, 2022, 13 pages.
Chinese Office Action for Chinese Patent Appl. No. 201980074548.1 mail date Aug. 19, 2022, 12 pages.
Extended European Search Report for Patent Application No. 23184819.3 mail date Jan. 4, 2024, 7 pages.
Office Action for EP application No. 23184819.3 mail date Jul. 30, 2024, 5 pages.
Office Action for KR Application No. 10-2023-0086705 mail date Aug. 16, 2024, 13 pages.
First and Second Objective Examination Report for Patent Application 123447458 mail date Sep. 16, 2024, 14 pages.
Notice of Reasons for Refusal for Japanese Patent Application No. 2023-112239 mail date Jul. 5, 2024, 22 pages.
Office action for European Patent Appl No. 23184819.3, mail date Dec. 13, 2024, 4 pages.
FirOffice action and English translation for Japanese Application No. 2023-112239, dated Nov. 19, 2024, 6 pages.

* cited by examiner

VARIABLE SPEED RECONFIGURABLE PUMP/TURBINE CLUSTERS

FIELD OF THE INVENTION

The invention relates to pumps and turbines, and more particularly, to pumps and turbines that are required to maintain high efficiency over a wide range of conditions of service.

BACKGROUND OF THE INVENTION

With reference to FIG. 1, pumps 102, turbines, and combination pump-turbines, referred to herein generically as "hydraulic rotating machinery" or "HRM," are traditionally operated at a fixed rotating speed, which is determined by the driving motor type and/or by the frequency of the power 110 derived from the electrical supply net 100. While an HRM can have a relatively wide condition of service ("COS") range over which it can be operated, optimal efficiency is typically realized only when the COS is a close match to the "best efficiency point" or BEP of the HRM, which is typically defined in terms of specified ranges of flow rate, flow volume, inlet and outlet pressure, inlet and outlet temperature, and sometimes also gas fraction and solid/liquid fraction, among other conditions.

If the COS that is demanded by a process 108 deviates too far from the BEP of the HRM, the HRM will run at a much lower hydraulic efficiency. Also, an HRM can sometimes be subject to increased wear and reduced operating life when the COS is far from the BEP, due to resulting forces such as bearing loads and vibration levels. In addition, the only way to control the hydraulic output 112 of such fixed speed HRMs is to use throttle valves 104, controlled for example by the measurements of a flow rate sensor 106, which introduces further energy losses.

One approach to maintaining HRM efficiency over wider COS ranges is to implement an HRM that can be driven at variable speeds. By changing the operating speed of a variable speed HRM, the BEP of the HRM can be shifted so that it remains close to a varying COS, thereby optimizing the overall efficiency of the process to which the HRM is applied. However, this approach can still be insufficient for some applications that require efficient operation over a very wide COS range.

Technologies for green energy storage and recovery can require the operation of HRMs over especially wide COS ranges. HRMs are typically used in these technologies both to store energy (pumping mode) and recover the energy (turbine mode). For example, excess energy can be used to pump water from a low-lying reservoir to an elevated reservoir during times of low energy demand, and then turbines can be used to recapture the energy as the water is allowed to flow from the elevated reservoir back to the low-lying reservoir during periods of high energy demand.

Similarly, HRMs can be used to pressurize and/or liquify a gas within a storage container during times when excess energy is available, and then the stored gas can be allowed to vaporize and/or expand during periods of high energy demand so that it can be used to operate a turbine. For example, energy can be stored by compressing carbon dioxide into a supercritical liquid state within a holding tank, and then vaporizing the carbon dioxide and directing the resulting gas through a turbine to recover the saved energy.

As another example, HRMs can be used to drive heat pump cycles that store energy by heating or cooling a thermal storage medium. In each case, a separate pump and turbine can be implemented, or a dual mode pump/turbine HRM can be used to meet the requirements of both the energy storage cycle and the energy recovery cycle of an energy storage system.

The full cycle of energy storage and subsequent energy recovery in such systems is referred to as the "round trip," and the efficiency of the round trip is called the "round trip efficiency" or "RTE." The RTE is defined as the ratio of the energy which can be recovered by the energy storage process, divided by the energy that was required to store the same energy. For example, if 100 MWH are used to store energy, and 80 MWh can be recovered from the stored energy as usable energy, the RTE is 80 MWh/100 MWh*100%=80%. The optimization of the RTE is extremely important for the economics of any given energy storage and recovery process, including green energy systems that require HRM operation over wide COS ranges.

What is needed, therefore, is an HRM solution that can provide optimal hydraulic energy efficiency over a very wide COS range.

SUMMARY OF THE INVENTION

The present invention is a "hydraulic rotating machinery" ("HRM") system that can provide optimal hydraulic energy efficiency over a very wide condition of service ("COS") range. In energy storage embodiments, the invention provides maximal round-trip efficiency ("RTE") for energy storage and recovery.

The invention comprises a plurality, or "cluster," of variable speed HRMs having operating speeds that are independently controlled by an HRM controller. The HRMs in the cluster are interconnected with each other by an HRM plumbing system that includes an inlet, an outlet, and one or more valves that can be actuated by the HRM controller to configure a flow path through which a process fluid flows from the inlet to the outlet via one or more of the HRMs in the cluster. By actively selecting the HRMs that are included in the flow path, the interconnections therebetween, and the operating speeds thereof, the HRM controller is able to ensure that the HRM cluster continues to operate at optimal efficiency as the COS fluctuates over a very wide range.

The following is a very simple example directed to a hypothetical HRM cluster comprising two identical, variable speed pumps, where the HRM cluster is used to store energy resulting from excess capacity of a green energy source by compressing a gas into a storage container. In this example, the operating speed of each of the pumps can be varied so as to maintain optimal efficiency when the volumetric flow rate through the pump is between 30 and 50 cubic feet per minute (cfm), and the output pressure is between 0 and 40 psi higher than the input pressure. As the process begins, the HRM controller has the option of either bypassing one of the pumps and adjusting the speed of the other pump to deliver gas to the storage container at 30-50 cfm, or connecting the two pumps in parallel to deliver the gas to the storage container at a flow rate of 60-100 cfm. The choice between these two options may depend, for example, on the amount of excess energy that is currently available from the green energy system.

Once the pressure in the storage container reaches 40 psi, the HRM controller reconfigures the pumps into a series configuration, and adjusts their operating speeds such that they are each efficiently pumping between 30 and 50 cfm over a pressure differential of 20 psi per pump. As the pressure within the storage container continues to rise above 40 psi, the operating speeds of the two pumps are varied so as to maintain optimum energy efficiency. In this series configuration, by controlling the operating speeds of the pumps, optimal hydraulic efficiency of the HRM cluster can be maintained up to a maximum of 40 psi per pump, i.e. 80 psi total.

This approach can be extended to clusters of more than two pumps as needed. For example, a cluster that includes four identical pumps as described above could be configured by an HRM controller to be entirely in parallel for container pressures up to 40 psi, in a series/parallel arrangement from 40 to 80 psi, and all in series for pressures from 80 to 160 psi, where the operating rates of the HRMs would be adjusted as needed such that each of the pumps operates at or near its BEP over this entire range. In the same way, this approach can be extended to clusters that include any combination of pumps, turbines, and/or hybrid pump/turbine HRMs ("hybrid" HRMs).

In some embodiments, the cluster includes only one type of HRM, for example one type of pump for clusters that are used only for pumping fluids, only one type of turbine for clusters that are used only for generating turboelectric energy, or only one type of hybrid HRM for clusters that are used both for pumping fluids and for generating turboelectric energy. In similar embodiments, the cluster includes a limited range of HRM types, such as a plurality of identical pumps and a plurality of identical turbines.

Limiting the number of different types of HRM that are included in a cluster can simplify the support and maintenance of the cluster and reduces costs, because only a relatively small inventory of "spare" HRMs is required to enable failed units in the cluster to be quickly replaced. This approach also enables the cluster to be readily expanded as needed, simply by adding additional HRMs from inventory to the cluster, and making corresponding extensions to the HRM plumbing system and controller, thereby enabling the cluster to be readily adapted to changing requirements of the process.

Other embodiments include HRM clusters comprising a plurality of different types of pumps, turbines, and/or hybrid HRMs having different BEPs, as well as HRMs that can tolerate different gas fractions and/or solid/liquid ratios. This approach can reduce the number of HRMs that are required to enable the cluster to maintain optimal energy efficiency over a wide range of COS. For example, if the process fluid is normally a liquid, but sometimes also includes gas and/or solids, then an HRM cluster might include at least one pump that is optimized for pumping a pure liquid and another pump that is optimized for pumping a hybrid fluid that includes gas and/or solids mixed with a liquid.

According to the present invention, the controller adjusts the operating speeds and interconnections of the HRMs based upon information received from one or more information sources. The information can include, for example, the energy status at any given time of a green energy source such as a solar panel or wind turbine, i.e. how much excess energy is available to be stored, or how much previously stored energy is currently needed. The information can also include sensed information regarding energy being consumed by pumps and/or generated by turbines in the cluster, as well as various process fluid parameters, such as pressures, volumetric flow rates, mass flow rates, geodetic fluid levels, static and dynamic fluid levels, static and dynamic fluid energies, fluid temperatures, fluid densities, fluid phases (gas, liquified, supercritical, solidified), amounts of solids and/or suspensions present in the fluid, gas fractions, and/or solid/liquid ratios, among others.

The HRM controller applies a process-dependent algorithm to these inputs so as to determine which of the HRMs in the cluster should be included in the flow path, how they should be interconnected, and at what speed each of the HRMs should be operated, thereby ensuring that each of the HRMs in the flow path continues to operate at or near its "best efficiency point" (BEP) as the conditions of service vary over a wide range.

In embodiments, the HRM controller also monitors the health of the HRMs in the clusters, for example by monitoring bearing temperatures, noise levels, vibrations, wear rates, and component deflections. The HRM controller is thereby able to predict when an HRM is nearing failure and should be repaired or replaced. Similarly, in various embodiments the HRM controller monitors the health of the overall process with which the HRM cluster is associated, for example detecting leaks and other problems by monitoring pressures, temperatures, and/or flow rates at various points in the process.

One general aspect of the present invention is a hydraulic rotating machinery (HRM) system that is configured to control a process fluid of a process, said process fluid having widely varying conditions of service (COS). The HRM system includes a controller, an HRM cluster comprising a plurality of HRMs having variable operating speeds, each of the HRMs being a pump, a turbine, or a hybrid pump/turbine, the operating speeds of the HRMs being controlled by the controller, an HRM plumbing system, the HRMs being interconnectable by the HRM plumbing system to form a flow path through which the process fluid can flow from an inlet of the HRM plumbing system to an outlet of the HRM plumbing system, a plurality of valves included in the HRM plumbing system, the controller being able to actuate the valves so as to control a selection of the HRMs that are included in the flow path and an arrangement in which the HRMs of the selection are included in the flow path, and non-transient media cooperative with the controller.

The non-transient media contains instructions that, when executed by the controller, cause the controller to accept information regarding at least one of a status of the process and the COS of the process fluid, and according to said information, control the operating speeds of the HRMs and the selection and arrangement of the HRMs in the flow path so as to continuously satisfy at least one requirement of the process while ensuring that the HRMs in the flow path operate substantially at their optimal hydraulic efficiency points over said widely varying COS of the process fluid.

In embodiments, all of the HRMs in the plurality of HRMs are identical to each other.

In any of the above embodiments, the plurality of HRMs can include pumps and turbines, all of the pumps in the plurality of HRMs being identical to each other, and all of the turbines in the plurality of HRMs being identical to each other.

In any of the above embodiments, the controller can be able to change the configuration of the flow path such that an interconnection of a pair of the HRMs in the flow path is changed between a parallel interconnection and a serial interconnection.

In any of the above embodiments, the controller can be able to change the configuration of the flow path such that an interconnection between four of the HRMs in the cluster is changed between a fully parallel interconnection, a series-parallel interconnection, and a fully series interconnection.

In any of the above embodiments, the process can be an energy generating process, and the HRM system can be configured to store a surplus energy output of the process when the process is subject to a low energy demand, and to recover said stored energy and supply the recovered energy to the process when the process is subject to a high energy demand.

In any of the above embodiments, the cluster can include at least one HRM that is configured for efficient operation upon a process fluid that is a mixture of a liquid and a gas.

In any of the above embodiments, the cluster can include at least one HRM that is configured for efficient operation upon a process fluid that is a liquid mixed with solids.

In any of the above embodiments, the cluster can include a first pump having first operating characteristics and a second pump having second operating characteristics that are distinct from the first operating characteristics.

In any of the above embodiments, the cluster includes a first turbine having first operating characteristics and a second turbine having second operating characteristics that are distinct from the first operating characteristics.

In any of the above embodiments, the cluster can include a first hybrid pump/turbine having first operating characteristics and a second hybrid pump/turbine having second operating characteristics that are distinct from the first operating characteristics.

In any of the above embodiments, the information received by the controller can include information pertaining to an operating health of an HRM in the cluster, and wherein the instructions, when executed by the controller, further cause the controller to predict a time until failure of the HRM.

A second general aspect of the present invention is a method of efficiently controlling a process fluid of a process, said process fluid having widely varying conditions of service (COS). The method includes providing a controller, providing a plurality of HRMs having variable operating speeds, each of the HRMs being a pump, a turbine, or a hybrid pump/turbine, interconnecting the HRMs via an HRM plumbing system to form an HRM cluster, the HRM plumbing system comprising a plurality of valves, controlling of the valves by the controller so as to configure a flow path through which the process fluid can flow from an inlet of the HRM plumbing system to an outlet of the HRM plumbing system, said flow path comprising a selection of the HRMs of the cluster arranged in an HRM arrangement, causing the process fluid to flow through the flow path, receiving by the controller of information regarding at least one of a status of the process and the COS of the process fluid, and according to said information, controlling by the controller of the operating speeds of the HRMs and the selection and arrangement of the HRMs in the flow path so as to continuously satisfy at least one requirement of the process while ensuring that the HRMs in the flow path operate substantially at their optimal hydraulic efficiency points over said widely varying COS of the process fluid.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is a "hydraulic rotating machinery" ("HRM") system that can provide high energy efficiency over a very wide condition of service ("COS") range. In energy storage embodiments, the invention provides maximal round-trip efficiency ("RTE") for energy storage and recovery.

Figure 1:
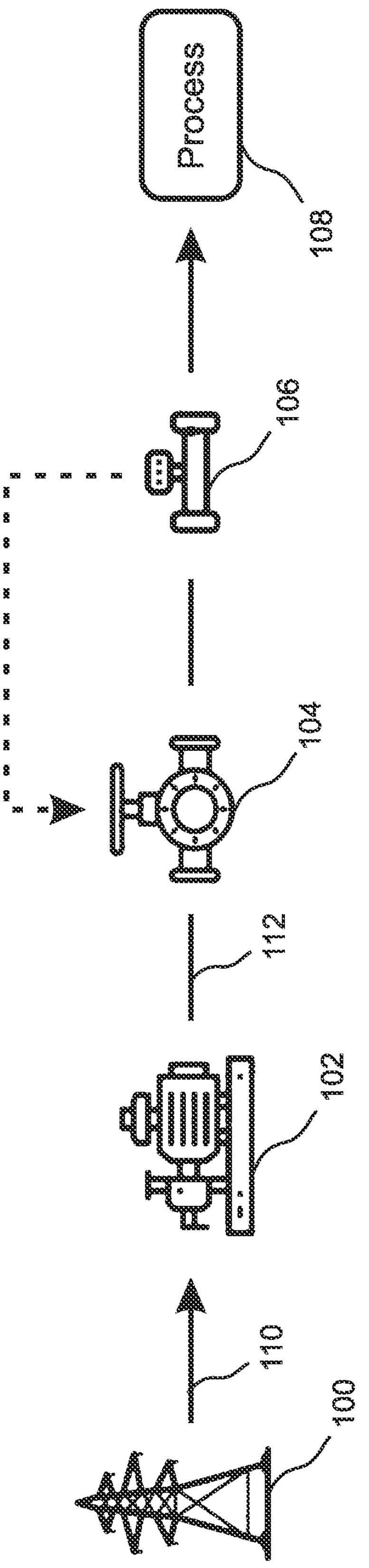
Fig. 1 (Prior Art)
FIG. 1 illustrates control of a process fluid by an HRM in an example of the prior art.
Figure 2:
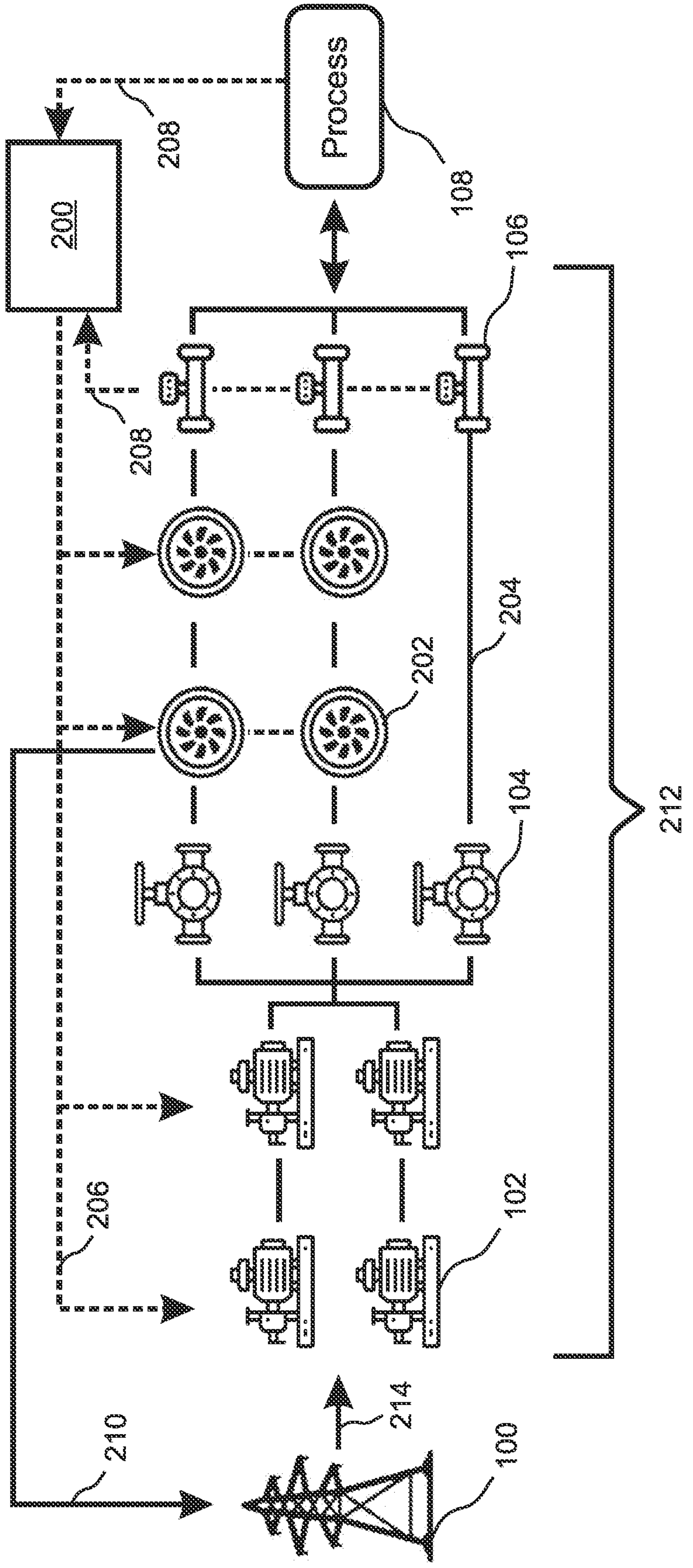
FIG. 2 illustrates an embodiment of the present invention in which an HRM cluster stores and then retrieves energy in support of a green energy system.
Figure 3A:
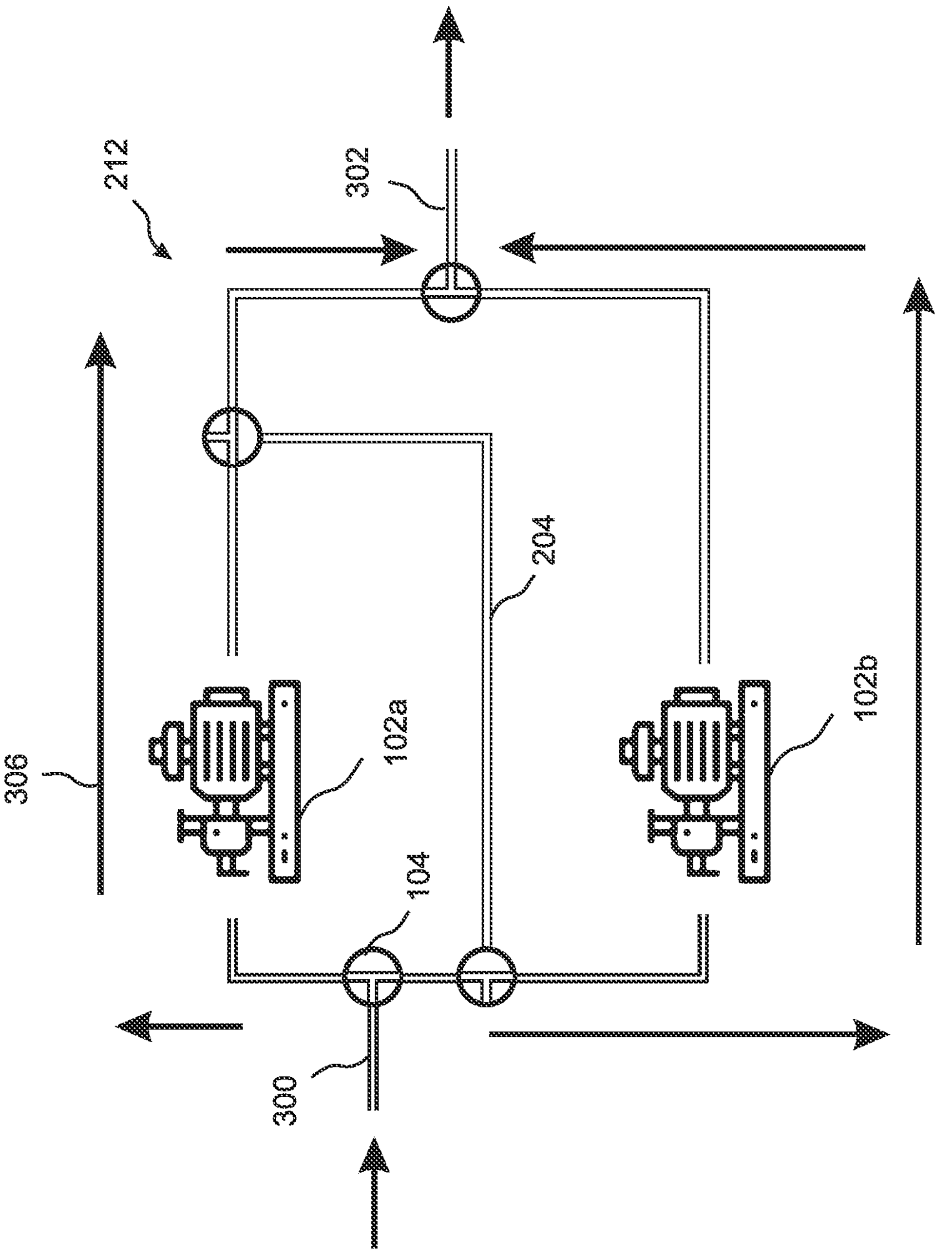
FIG. 3A illustrates an HRM cluster comprising two HRMs, where the HRMs are connected in parallel by the HRM plumbing system according to an embodiment of the present invention.

With reference to FIGS. 2 and 3A, the invention comprises a plurality, or "cluster" 212, of variable speed HRMs 102, 202 having operating speeds that are independently controlled 206 by an HRM controller 200. The HRMs 102, 202 in the cluster 212 are interconnected with each other by an HRM plumbing system 204 that includes an inlet 300, an outlet 302, and one or more valves 104 that can be actuated by the HRM controller 200 to configure a flow path 306 through which a process fluid flows from the inlet 300 to the outlet 302 via one or more of the HRMs 102, 202 in the cluster 212. By actively selecting which of the HRMs 102, 202 are included in the flow path 306, the interconnections therebetween, and the operating speeds thereof, the HRM controller 200 is able to ensure that the HRM cluster 212 continues to operate at optimal efficiency as the COS fluctuates over a very wide range.

Figure 3B:
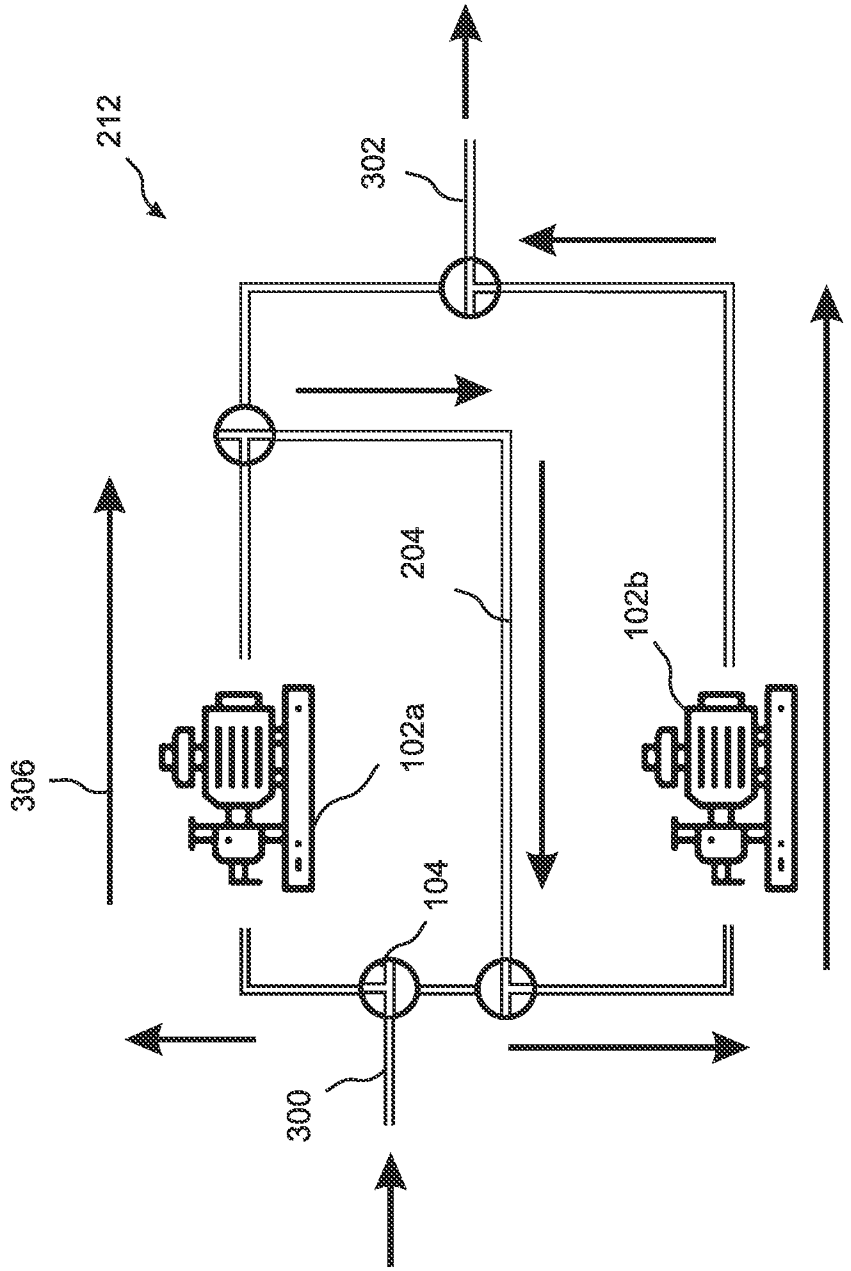
FIG. 3B illustrates an HRM cluster comprising two HRMs, where the HRMs are connected in series by the HRM plumbing system.

FIGS. 3A-3B illustrate a very simple example of a hypothetical HRM cluster 212 comprising two identical, variable speed pumps 102*a*, 102*b*, where the HRM cluster 212 is used to store energy resulting from excess capacity of a green energy source by pumping water into a storage compressor, thereby compressing a gas that is contained within the storage container (not shown). In this hypothetical example, the operating speed of each of the pumps 102*a*, 102*b* can be varied so as to maintain optimal hydraulic efficiency when the volumetric flow rate through the pump 102*a*, 102*b* is between 30 and 50 cubic feet per minute (cfm), and the output pressure is between 0 and 40 psi higher than the input pressure. As the process begins, the HRM controller 200 has the option of either bypassing one of the pumps 102*b* and adjusting the speed of the other pump 102*a* to deliver gas to the storage container at 30-50 cfm. FIG. 3A illustrates the other possibility, which is to cause the valves 104 to interconnect the two pumps 102*a*, 102*b* in a parallel configuration to deliver the gas to the storage container at a flow rate of 60-100 cfm. The choice between these two options may depend, for example, on the amount of excess energy that is currently available from the green energy system.

With reference to FIG. 3B, once the pressure in the storage container reaches 40 psi, the HRM controller causes the valves 104 to reconfigure the pumps 102*a*, 102*b*, into a series configuration, and adjusts their operating speeds such that they are each pumping between 30 and 50 cfm over a pressure differential of psi per pump. As the pressure within the storage container continues to rise above 40 psi, the operating speeds of the two pumps 102*a*, 102*b* are varied so as to maintain optimum energy efficiency. In the series configuration of FIG. 3B, by controlling the operating speeds of the pumps, optimal efficiency of the HRM cluster 212 can be maintained up to a maximum of 40 psi per pump, i.e. 80 psi total.

Figure 4A:
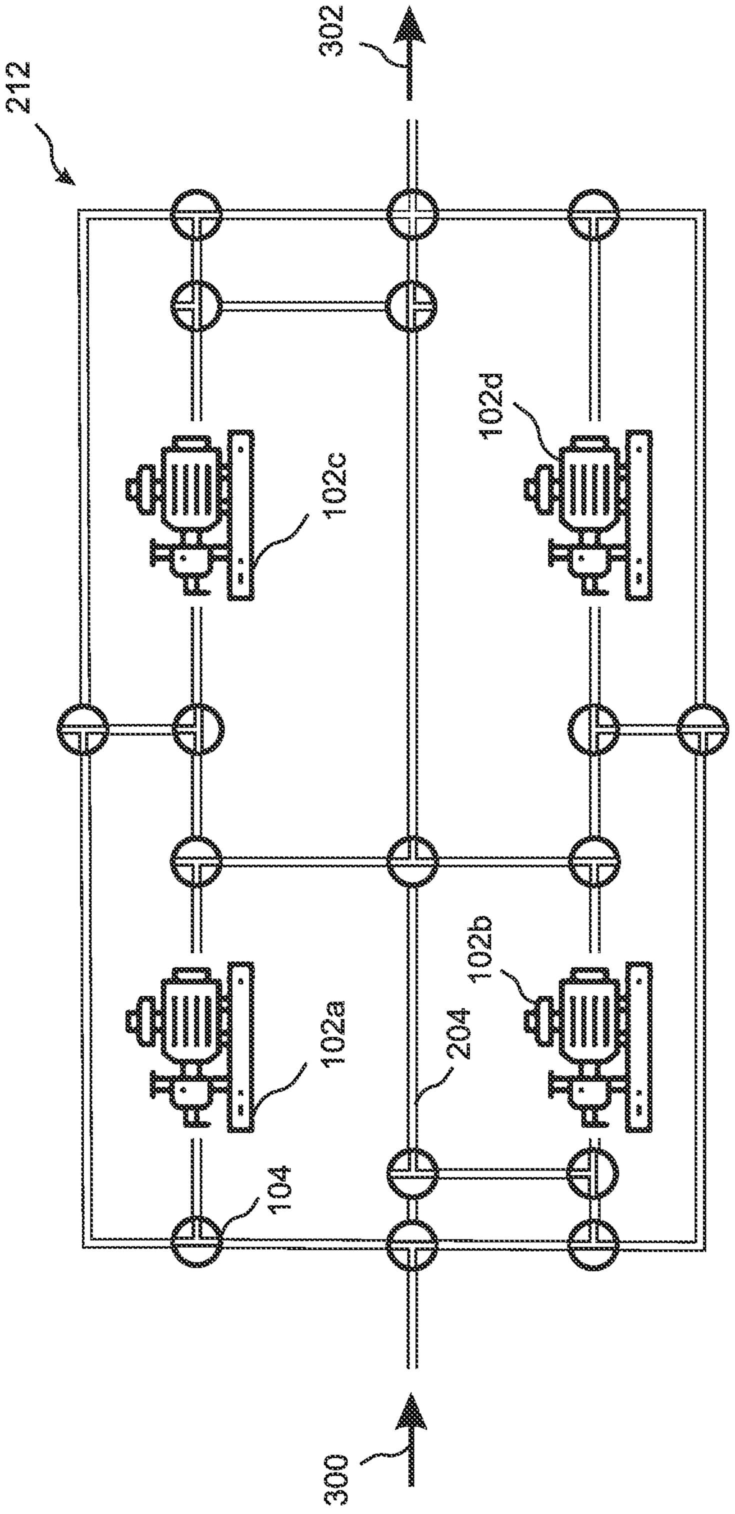
FIG. 4A is a block diagram of an HRM cluster comprising four HRMs, where the HRMs are connected in parallel by the HRM plumbing system according to an embodiment of the present invention.
Figure 4B:
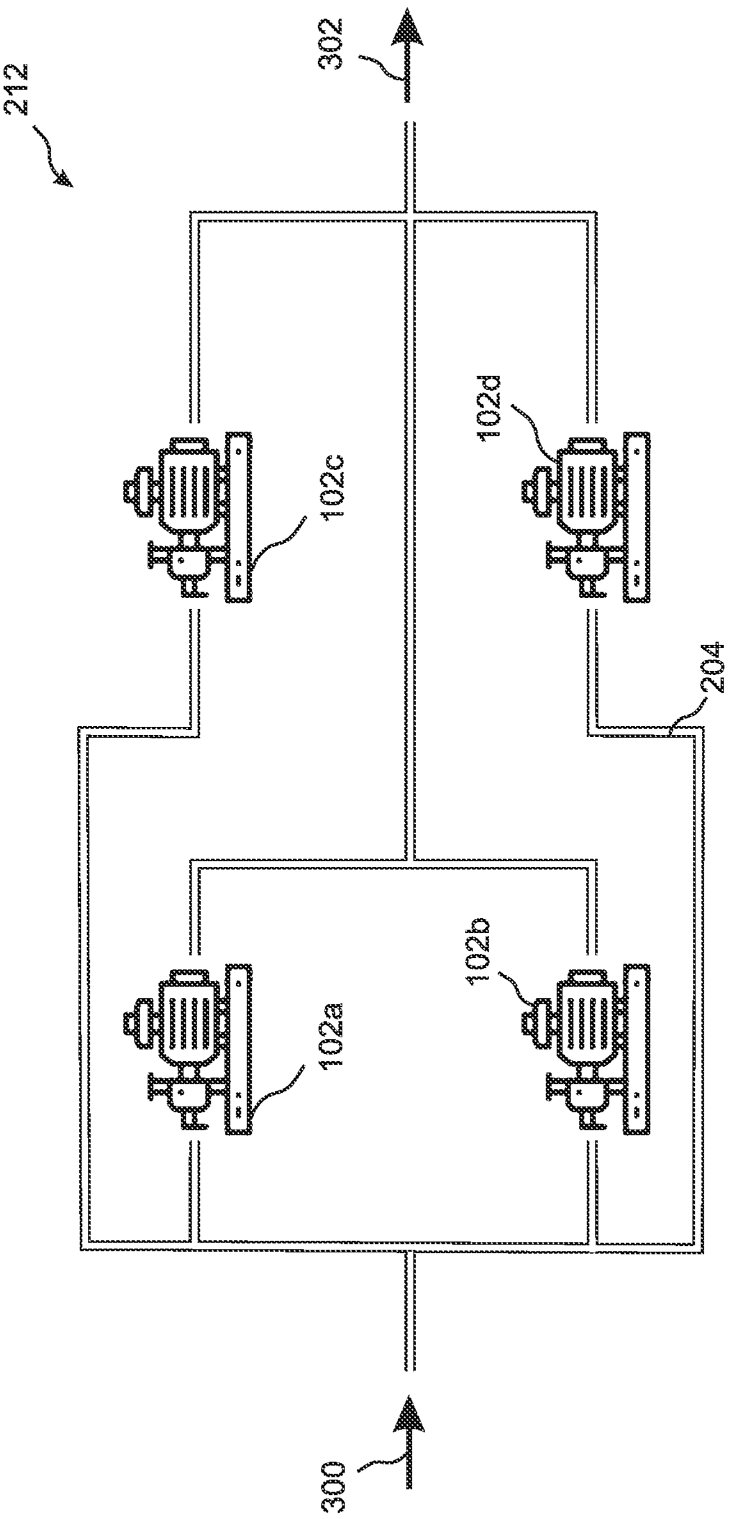
FIG. 4B is a simplified block diagram of the cluster of FIG. 4A, showing the flow path through the cluster.
Figure 4C:
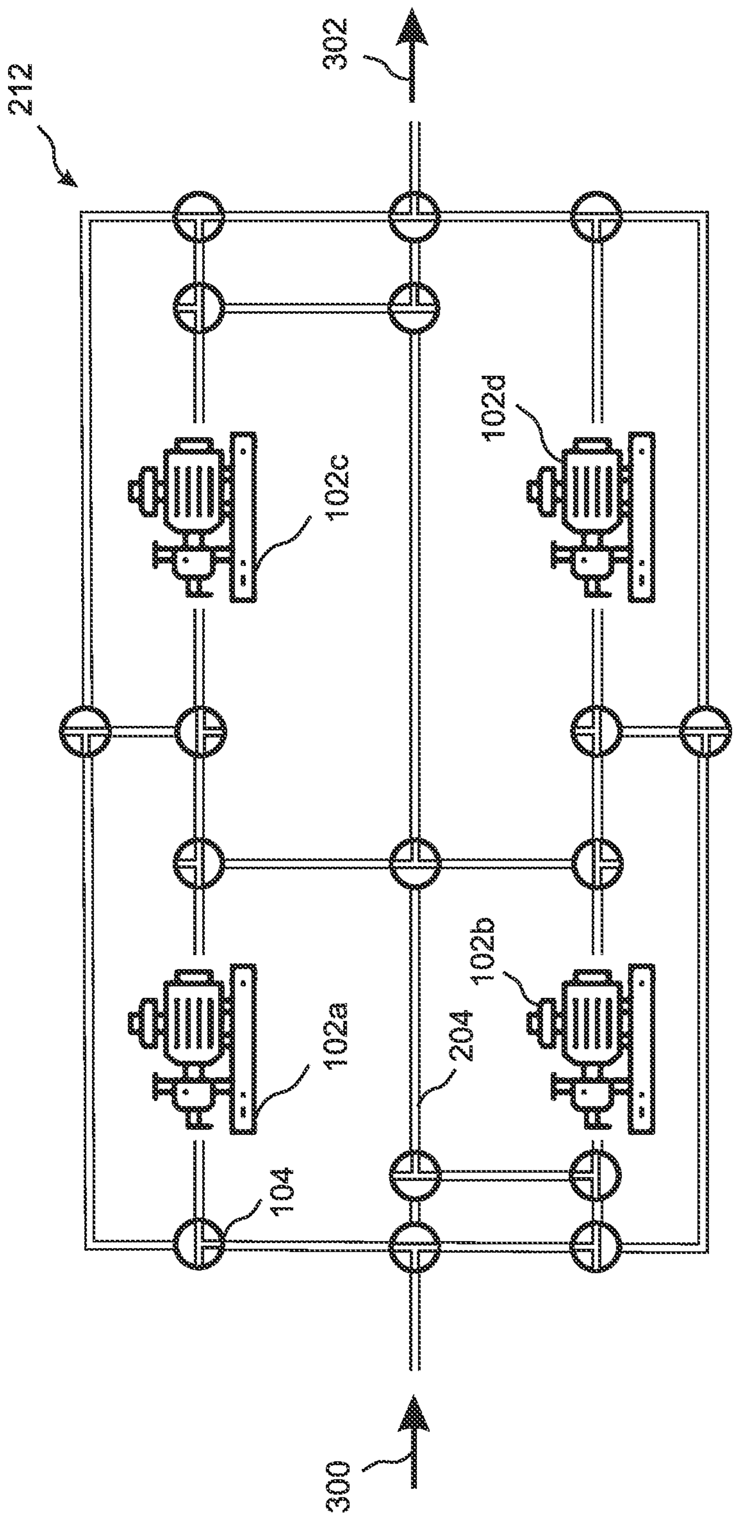
FIG. 4C is a block diagram of an HRM cluster comprising four HRMs, where the HRMs are connected in a series-parallel arrangement by the HRM plumbing system according to an embodiment of the present invention.
Figure 4D:
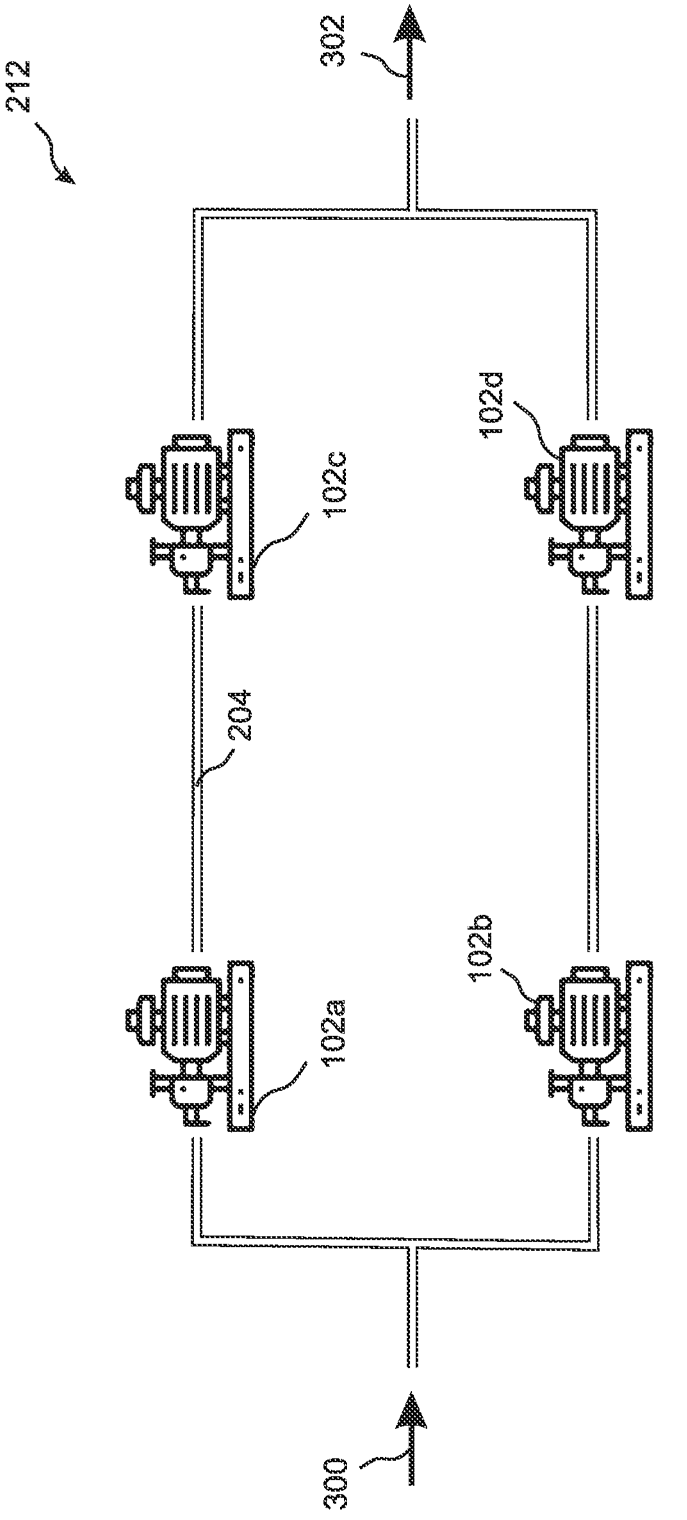
FIG. 4D is a simplified block diagram of the cluster of FIG. 4C, showing the flow path through the cluster.
Figure 4E:
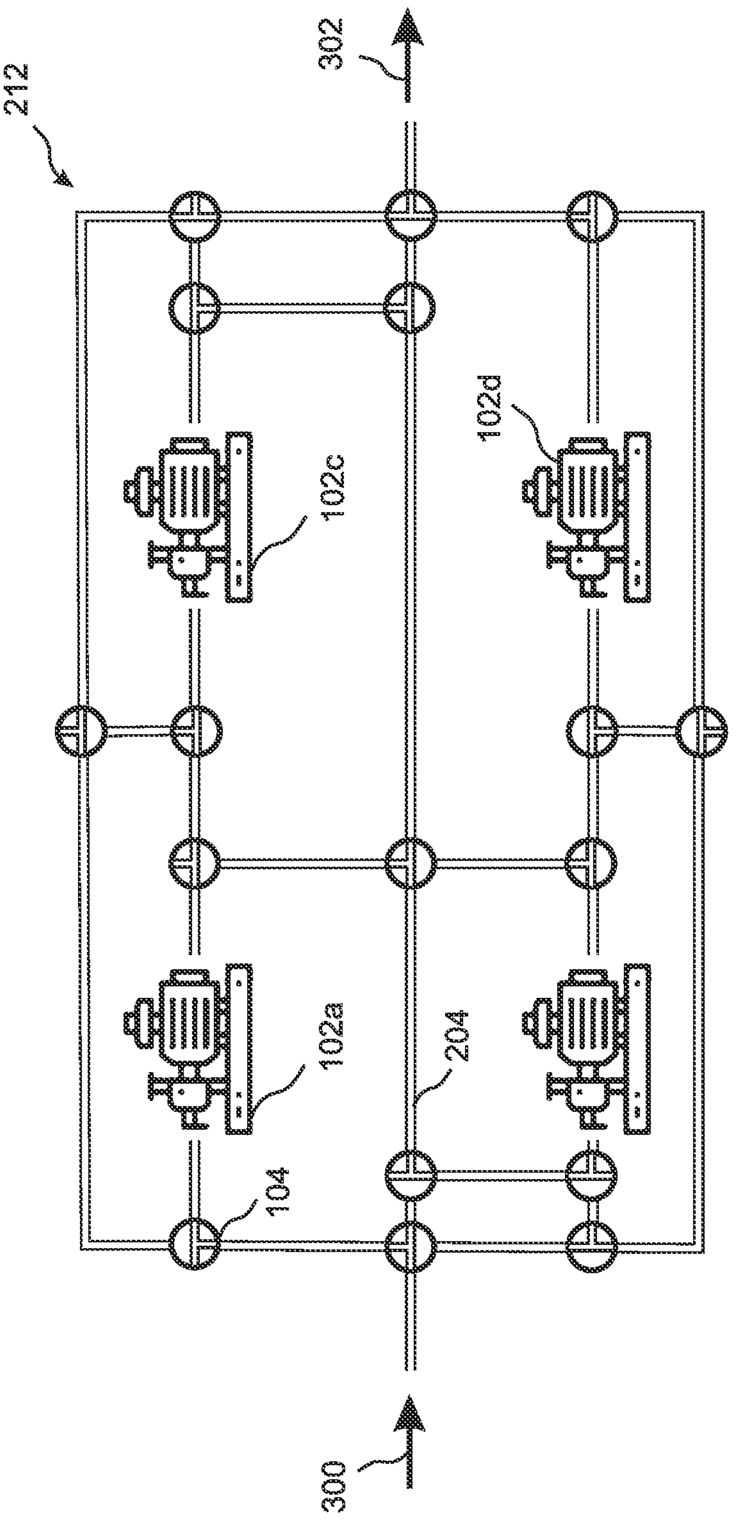
FIG. 4E is a block diagram of an HRM cluster comprising four HRMs, where the HRMs are connected in series by the HRM plumbing system according to an embodiment of the present invention.
Figure 4F:
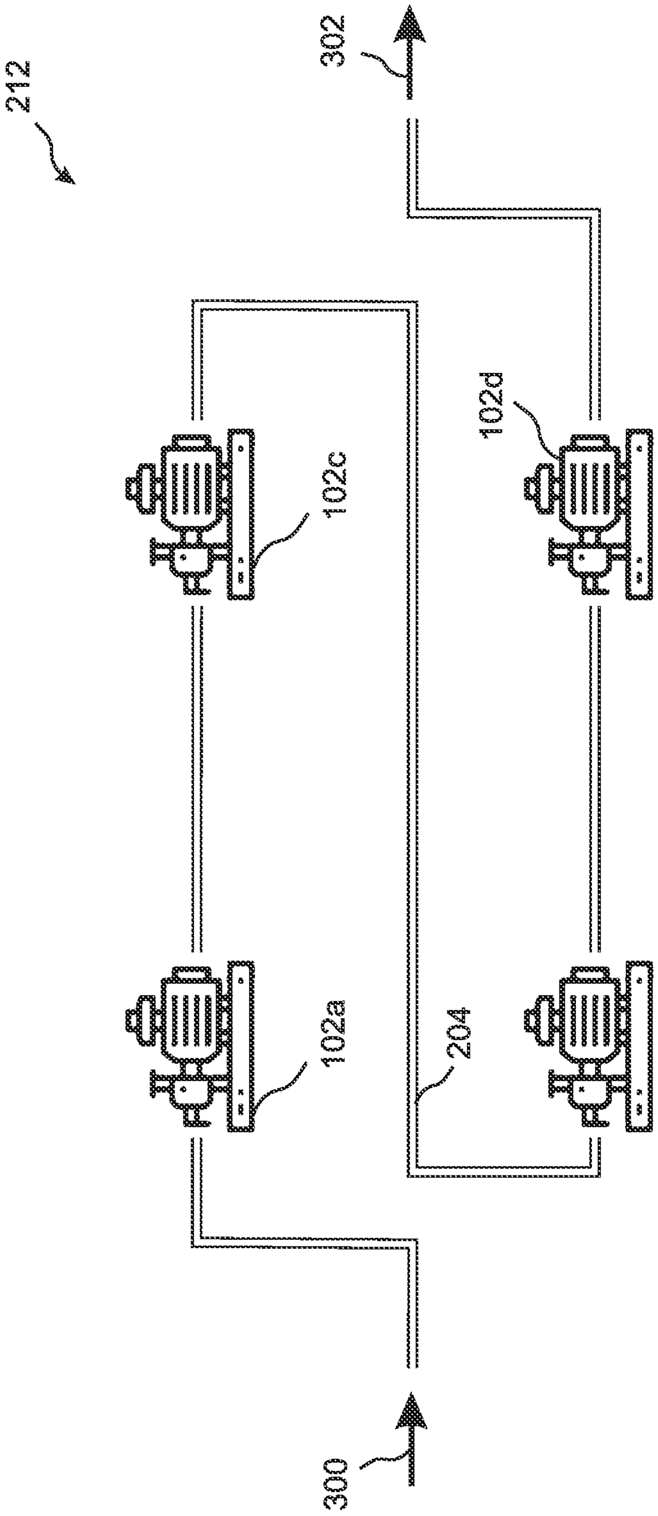
FIG. 4F is a simplified block diagram of the cluster of FIG. 4E, showing the flow path through the cluster.

This approach can be extended to clusters of more than two pumps so as to cover even wider COS ranges as needed. For example, with reference to FIGS. 4A-4B, a cluster 212 that includes four identical pumps 102*a*, 102*b*, 102*c*, 102*d* (collectively 102) as described above could be configured by an HRM controller 200 to be entirely in parallel for container pressures up to 40 psi, as illustrated by FIG. 4A. The flow path for this configuration is illustrated by FIG. 4B. As the pressure differential varies from 40 to 80 psi, the controller 200 can then cause the valves 104 in the HRM plumbing system to reconfigure the pumps 102 into a series/parallel arrangement, as illustrated in FIG. 4C. The flow path 204 for this configuration is illustrated in FIG. 4D. Once the pressure differential rises above psi, the controller 200 can configure the pumps 200 so that they are all in series, thereby enabling the cluster 212 to continue operating at optimum efficiency for pressure differentials from 80 to 160 psi. According to this simple example, by varying both the operating speeds of the pumps and the interconnections between the pumps, the controller 200 is able to ensure that each of the pumps continues to operate at or near its BEP over this entire range. In the same way, this approach can be extended to clusters that include any combination of pumps, turbines, and/or hybrid pump/turbine HRMs ("hybrid" HRMs).

In some embodiments, the cluster 212 includes only one type of HRM, for example one type of pump 102 for clusters that are used only for pumping fluids, only one type of turbine 202 for clusters that are used only for generating turboelectric energy, or only one type of hybrid HRM for clusters that are used both for pumping fluids and for generating turboelectric energy. In similar embodiments, the cluster 212 includes a limited range of HRM types, such as a plurality of identical pumps 102 and a plurality of identical turbines 202.

Limiting the number of different types of HRM that are included in a cluster 212 can simplify the support and maintenance of the cluster 212 and reduces costs, because only a relatively small inventory of "spare" HRMs is required to enable failed units in the cluster 212 to be quickly replaced. This modular approach also enables the cluster 212 to be readily expanded as need, simply by adding additional HRMs from inventory to the cluster 212, with appropriate extensions to the HRM plumbing system 204 and to the controller 200, thereby enabling the cluster 212 to be readily adapted to changing requirements of the process.

Other embodiments include clusters comprising a plurality of different types of pumps 102, turbines 202, and/or hybrid HRMs having different BEPs, as well as HRMs that can tolerate different gas fractions and/or solid/liquid ratios. This approach can reduce the number of HRMs that are required to enable the cluster 212 to maintain optimal energy efficiency over a wide range of COS. For example, if the process fluid is normally a liquid, but sometimes also includes gas and/or solids, then an HRM cluster 212 can include at least one pump 102 that is optimized for pumping a pure liquid and another pump 102 that is optimized for pumping a hybrid fluid that includes gas and/or solids mixed with a liquid.

Figure 5:
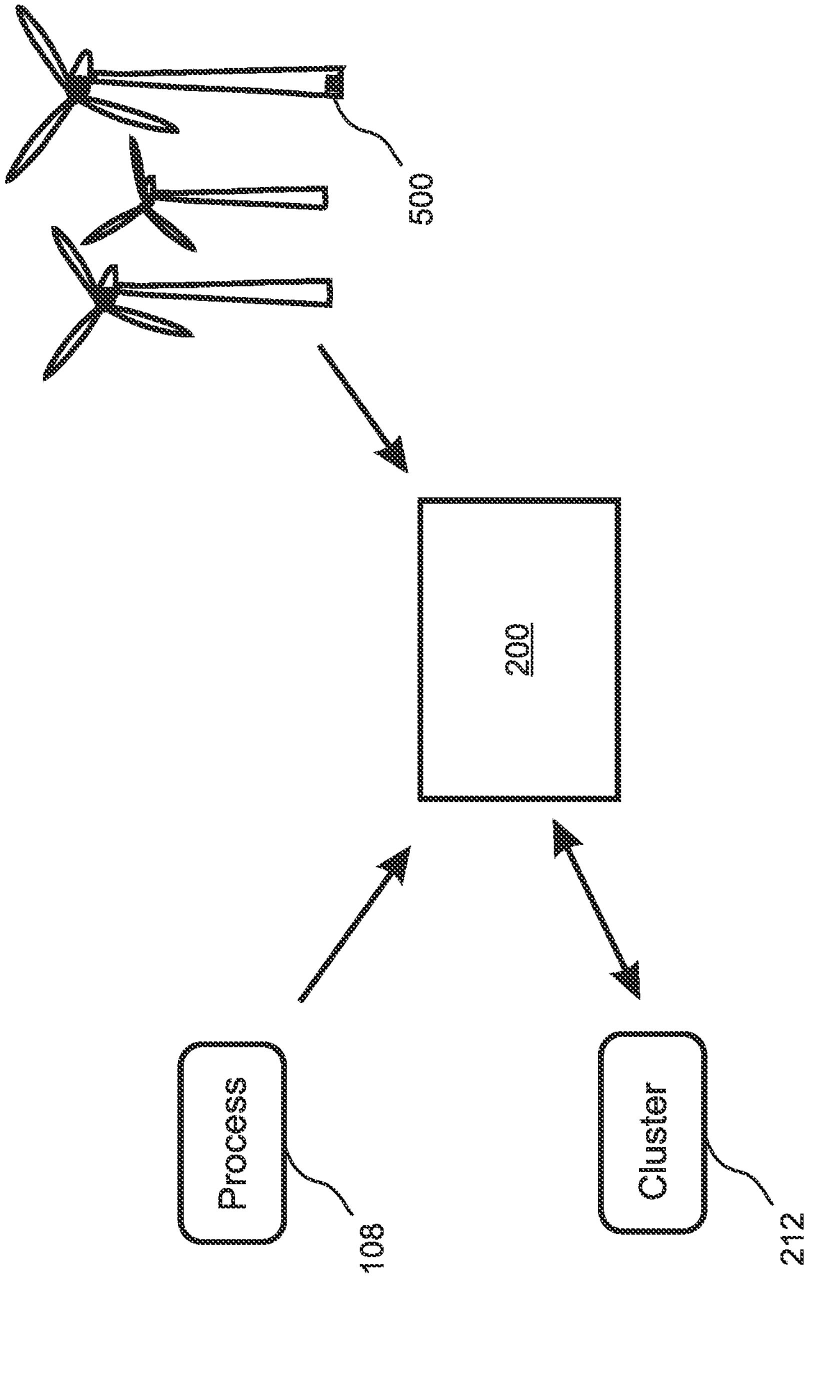
FIG. 5 is a block diagram that illustrates an exchange of information between a controller and an HRM cluster, a process, and a green energy system.

With reference to FIG. 5, the HRM controller 200 adjusts the HRM operating speeds and interconnections based upon information received from one or more information sources. The information can include, for example, the energy status at any given time of a green energy source such as a solar panel or wind turbine 500, i.e. how much excess energy is available to be stored, or how much previously stored energy is currently needed. The information can also include sensed information regarding energy being consumed 214 by pumps 102 and/or generated 210 by turbines 202 in the cluster 212, as well as information regarding the status of the process 108, such as pressures, flow rates, mass flow rates, geodetic fluid levels, static and dynamic fluid levels, static and dynamic fluid energies, fluid temperatures, fluid densities, fluid phases (gas, liquified, supercritical, solidified), amounts of solids and/or suspensions present in the process fluid, gas fractions, and/or solid/liquid ratios, among others.

The HRM controller applies a process-dependent algorithm to this information so as to determine which of the HRMs in the cluster 212 should be included in the flow path, how they should be interconnected, and at what speed each of the HRMs should be operated, thereby ensuring that each of the HRMs in the flow path operates at or near its "best efficiency point" (BEP).

In embodiments, the HRM controller 200 also monitors 208 the health of the HRMs in the cluster 212, for example by monitoring bearing temperatures, noise levels, vibrations, wear rates, and component deflections. The HRM controller is thereby able to predict when an HRM is nearing failure and should be repaired or replaced. Similarly, in various embodiments the HRM controller 200 monitors 208 the health of the overall process 108 with which the HRM cluster 200 is associated, for example detecting leaks and other problems by monitoring pressures, temperatures, and/or flow rates at various points in the process.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. A hydraulic rotating machinery (HRM) system that is configured to control a process fluid of a process, said process fluid having widely varying conditions of service (COS), the HRM system comprising:
- a controller;
- an HRM cluster comprising a plurality of HRMs having variable operating speeds, each of the HRMs being a pump, a turbine, or a hybrid pump/turbine, the operating speeds of the HRMs being controlled by the controller;
- an HRM plumbing system, the HRMs being interconnectable by the HRM plumbing system to form a flow path through which the process fluid can flow from an inlet of the HRM plumbing system to an outlet of the HRM plumbing system;
- a plurality of valves included in the HRM plumbing system, the controller being able to actuate the valves so as to control a selection of the HRMs that are included in the flow path and an arrangement in which the HRMs of the selection are included in the flow path;
- the controller being able to change a configuration of the flow path such that an interconnection of a pair of the HRMs in the flow path is changed between a parallel interconnection and a serial interconnection;
- the controller being further able to change the configuration of the flow path such that an interconnection between a first, a second, a third, and a fourth of the HRMs in the cluster is changed between;
  - a fully parallel interconnection;
  - a series-parallel interconnection;
  - a fully series interconnection;
  - an interconnection in which the first and second HRMs are in series while the third and fourth HRMs are bypassed;
  - an interconnection in which the first and third HRMs are in series while the second and fourth HRMs are bypassed;
  - an interconnection in which the first and fourth HRMs are in series while the second and third HRMs are bypassed;
  - an interconnection in which the second and third HRMs are in series while the first and fourth HRMs are bypassed;
  - an interconnection in which the second and fourth HRMs are in series while the first and third HRMs are bypassed; and
  - an interconnection in which the third and fourth HRMs are in series while the first and second HRMs are bypassed; and
- non-transient media cooperative with the controller, the non-transient media containing instructions that, when executed by the controller, cause the controller to:
  - accept information regarding at least one of a status of the process and the COS of the process fluid; and
  - according to said information, control the operating speeds of the HRMs and the selection and arrangement of the HRMs in the flow path so as to continuously satisfy at least one requirement of the process while ensuring that the HRMs in the flow path operate substantially at their optimal hydraulic efficiency points over said widely varying COS of the process fluid.

2. The HRM system of claim 1, wherein all of the HRMs in the plurality of HRMs are identical to each other.

3. The HRM system of claim 1, wherein the plurality of HRMs includes pumps and turbines, all of the pumps in the plurality of HRMs being identical to each other, and all of the turbines in the plurality of HRMs being identical to each other.

4. The HRM system of claim 1, wherein the process is an energy generating process, and the HRM system is configured to store a surplus energy output of the process when the process is subject to a low energy demand, and to recover said stored energy and supply the recovered energy to the process when the process is subject to a high energy demand.

5. The HRM system of claim 1, wherein the cluster includes at least one HRM that is configured for efficient operation upon a process fluid that is a mixture of a liquid and a gas.

6. The HRM system of claim 1, wherein the cluster includes at least one HRM that is configured for efficient operation upon a process fluid that is a liquid mixed with solids.

7. The HRM system of claim 1, wherein the cluster includes a first pump having first operating characteristics and a second pump having second operating characteristics that are distinct from the first operating characteristics.

8. The HRM system of claim 1, wherein the cluster includes a first turbine having first operating characteristics and a second turbine having second operating characteristics that are distinct from the first operating characteristics.

9. The HRM system of claim 1, wherein the cluster includes a first hybrid pump/turbine having first operating characteristics and a second hybrid pump/turbine having second operating characteristics that are distinct from the first operating characteristics.

10. The HRM system of claim 1, wherein the information received by the controller includes information pertaining to an operating health of an HRM in the cluster, and wherein the instructions, when executed by the controller, further cause the controller to predict a time until failure of the HRM.

11. The HRM system of claim 1, wherein the HRM cluster comprises a first HRM that is configured to pressurize a process fluid of an energy storage and recovery process by operating as a pump, and a second HRM that is configured to extract electrical energy from the process fluid by operating as a turbine, and wherein the instructions, when executed by the controller, cause the controller to:
- during a pumping mode of the HRM system, cause the first HRM to store energy by pressurizing the process fluid; and
- during a turbine mode of the HRM system, cause the second HRM to recover the stored energy from the process fluid as electrical energy.

12. A method of efficiently controlling a process fluid of a process, said process fluid having widely varying conditions of service (COS), the method comprising:
- providing a controller;
- providing a plurality of HRMs having variable operating speeds, each of the HRMs being a pump, a turbine, or a hybrid pump/turbine interconnecting the HRMs via an HRM plumbing system to form an HRM cluster, the HRM plumbing system comprising a plurality of valves;

controlling of the valves by the controller so as to configure a flow path through which the process fluid can flow from an inlet of the HRM plumbing system to an outlet of the HRM plumbing system, said flow path comprising a selection of the HRMs of the cluster arranged in an HRM arrangement;

causing the process fluid to flow through the flow path;

receiving by the controller of information regarding at least one of a status of the process and the COS of the process fluid; and according to said information, controlling by the controller of the operating speeds of the HRMs and the HRM arrangement so as to continuously satisfy at least one requirement of the process while ensuring that the HRMs in the flow path operate substantially at their optimal hydraulic efficiency points over said widely varying COS of the process fluid;

wherein said controller is able to change a configuration of the flow path such that an interconnection of a pair of the HRMs in the flow path is changed between a parallel interconnection and a serial interconnection; and wherein said controller is further able to change the interconnection between a first, a second, a third, and a fourth of the HRMs in the cluster between;

a fully parallel interconnection;

a series-parallel interconnection;

a fully series interconnection;

an interconnection in which the first and second HRMs are in series while the third and fourth HRMs are bypassed;

an interconnection in which the first and third HRMs are in series while the second and fourth HRMs are bypassed;

an interconnection in which the first and fourth HRMs are in series while the second and third HRMs are bypassed;

an interconnection in which the second and third HRMs are in series while the first and fourth HRMs are bypassed;

an interconnection in which the second and fourth HRMs are in series while the first and third HRMs are bypassed; and an interconnection in which the third and fourth HRMs are in series while the first and second HRMs are bypassed.

* * * * *